United States Patent Office 2,979,505
Patented Apr. 11, 1961

2,979,505

PROCESS FOR HYDROGENATION OF NITROSAMINES

William B. Tuemmler, Catonsville, and Hans J. S. Winkler, College Park, Md., assignors to Food Machinery and Chemical Corporation, New York, N.Y., a corporation of Delaware No Drawing. Filed Aug. 6, 1957, Ser. No. 676,504

13 Claims. (Cl. 260—247.5)

This invention relates to an improved process for the hydrogenation of N-nitroso compounds to form substituted hydrazines.

In the past nitrosamines have been converted to substituted hydrazines by reduction with a metal such as zinc and an acid such as acetic. Such processes are expensive. It has also been proposed to hydrogenate the nitrosamines with hydrogen in the presence of a palladium catalyst. However, this process, although more economical than the zinc-acid process, has certain undesirable features. The present invention constitutes an improvement in the catalytic hydrogenation process.

The desired reaction in the production of N,N-disubstituted hydrazines from the corresponding nitrosamines by catalytic hydrogenation is represented by the following chemical equation:

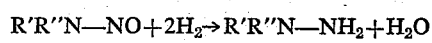

The reaction is usually accompanied by one or more undesired side reactions which result in conversion of the nitrosamine back to the amine from which it was formed. The two side reactions which are most frequently encountered are represented by the following equations:

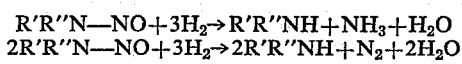

Under some conditions these side reactions may predominate or may take place almost to the complete exclusion of the desired reaction.

In hydrogenating N-nitroso compounds using hydrogen and a palladium catalyst, the nitroso compound is usually dissolved or suspended in water or other liquid, the catalyst is added, the mixture heated to a temperature in the range 25° to 100° C., and hydrogen is passed into the well agitated mixture under superatmospheric pressure. The catalyst is more effective if it is supported on active carbon, alumina, calcium carbonate, or other similar insoluble material.

Several difficulties have been encountered in the past in carrying out the hydrogenation of nitrosamines with a palladium catalyst. A substantial fraction of the nitrosamine has been converted to the undesired amine, thus reducing the yield of the desired substituted hydrazine. The rate of reaction is such that the time required to complete the hydrogenation is often a matter of hours or days, thus limiting production from equipment of a given size. The quantity of catalyst required has been such as to add appreciably to the cost of the product. Also, results have often been erratic from batch to batch, with unexplained variations in yield and reaction rate.

The side reactions leading to formation of the amine cause difficulties not only because of the resulting loss in efficiency and output of hydrazine, but also because the amine has the effect of poisoning the palladium catalyst.

It is an object of the present invention to provide an improved process for the hydrogenation of nitrosamines using palladium as a catalyst in which the above-described difficulties are eliminated or greatly alleviated.

In accordance with the present invention it has been found that greatly improved results can be obtained in the hydrogenation of nitrosamines over a palladium catalyst by adding a small amount of an iron compound to the reaction mixture.

In addition to increasing the ratio of desired hydrazine to undesired amine, thus increasing the efficiency of the process and simplifying subsequent purification procedures, the presence of an iron salt in the reaction mixture also increases the rate of the reaction, reduces the quantity of palladium catalyst required, prolongs the life of the catalyst, and eliminates the wide variations from batch to batch that otherwise occur.

The advantages of the improved process are obtained by adding either ferrous or ferric compounds to the reaction system. Insoluble iron compounds and even metallic iron may be used if a small amount of a strong acid is added to dissolve such substances. It is preferred to add the iron compound directly to the reaction system, but it may also be incorporated into the catalyst by co-precipitation along with the palladium at the time of catalyst preparation, or it may be adsorbed on the catalyst before the latter is added to the reaction system.

It is believed that ferrous iron is the active agent and that when ferric iron is added it is reduced to ferrous iron in the presence of hydrogen and the palladium catalyst. In some instances, it is advantageous to select an iron salt on the basis of solubility in the solvent used as a reaction medium.

The palladium catalyst is suitably prepared by depositing 5 parts of palladium on 95 parts of active carbon or other support, such as alumina, calcium carbonate, barium fulfate, and the like. Higher proportions of palladium to support may be used but give little advantage. Lower proportions may be advantageously used when the optimum quantity of ferrous iron is present.

Only a very small amount of iron salt is necessary to give the improved results. The optimum concentration appears to be that corresponding to approximately 0.5 millimole of iron (0.14 gram as ferrous sulfate heptahydrate) per gram of palladium catalyst. Very much smaller amounts, even as little as 0.0005 millimole, have an appreciable effect. Much larger amounts, such as 5 to 25 millimoles per gram of catalyst, give less benefit than smaller amounts.

While the mechanism by which the iron compounds affect the reaction is not completely understood, it is believed that they eliminate or neutralize catalyst poisons present in varying amounts in the starting materials or formed as by-products during the course of the reaction.

Compounds of a number of elements other than iron were tested for their effect in this process. Only iron compounds gave a significant improvement in results. Salts of some elements had no appreciable effect; some reduced the rate of reaction; and some resulted in a marked increase in the formation of amine rather than the desired hydrazine. It was surprising to find that salts of elements closely related to iron, including manganese, cobalt, and nickel had no beneficial effect and in some cases even completely inhibited the desired reaction.

It was found also that when iron compounds were used in conjunction with other catalysts, such as platinum and nickel, for the same reaction, no benefit was obtained. The effect of iron compounds with palladium catalysts in the hydrogenation of certain nitrosamines appears to be quite specific.

The compounds that may be reduced to hydrazines with the iron-promoted palladium catalyst are the dialkyl and heterocyclic nitrosamines, such as nitrosodimethyl-"

amine, nitroso-di-n-butylamine, nitroso-di-2-ethylhexylamine, nitrosomorpholine, nitrosopiperidine, nitrosopyrrolidine, dinitrosopiperazine, etc. Various substituent groups may be present provided they are inert under the conditions of the reaction.

When aromatic nitrosamines are hydrogenated according to this process no hydrazine is obtained whether or not iron compounds are present. When mixed aliphatic-aromatic nitrosamines are hydrogenated, an improved conversion to the hydrazine is obtained when iron compounds are present but the yields are in general too low to be of practical interest.

Water is the preferred liquid medium for carrying out the reaction, although alcohol or other organic solvent may be used. Good results are obtained when water is used even with those nitrosamines, such as dinitrosopiperazine, which are only very slightly soluble in water.

The nitrosamines used as starting materials may be formed by known processes by reacting a secondary amine with a nitrite in the presence of an acid, or by other known reactions.

*Example 1.*—A series of experiments was run to study the effect of iron salts on the hydrogenation of nitrosodimethylamine to produce N,N-dimethylhydrazine. The reaction mixture was prepared by dissolving 15.0 milliliters of nitrosodimethylamine in 135 milliliters of water and adding 1 gram of catalyst composed of 5 parts palladium and 95 parts active carbon. Where used, the iron salt was added directly to the reaction mixture. The reaction was carried out at 45° C. under a gauge pressure of 40–50 pounds per square inch of hydrogen in conventional shaking-type hydrogenation apparatus. The reaction was followed by noting the decrease in pressure and was assumed to be complete when no further decrease in pressure occurred. The time at which the reaction was 50% complete was read from a graph in which moles hydrogen reacted per mole of nitrosamine was plotted against time, and represents the time required for reaction of one mole of hydrogen per mole of nitrosamine. The results of seven experiments are given in Table I.

TABLE I

*Hydrogenation of ten percent aqueous nitrosodimethylamine*

| Expt. No. | Iron Salt | Amount, Millimoles | Reaction Time, Min. | | Conversion, Percent | |
|---|---|---|---|---|---|---|
| | | | 50% | 100% | Hydrazine | Amine |
| 1 | None | | 15 | 40 | 88.7 | 8.1 |
| 2 | FeSO₄ | .0005 | 13 | 31 | 88.8 | 8.3 |
| 3 | FeSO₄ | .005 | 13 | 31 | 89.2 | 7.8 |
| 4 | FeSO₄ | .05 | 10 | 20 | 90.1 | 7.1 |
| 5 | FeSO₄ | 0.5 | 9 | 17 | 92.5 | 6.6 |
| 6 | FeSO₄ | 4.7 | 17 | 34 | 85.3 | 9.9 |
| 7 | FeCl₃ | 0.5 | 12 | 25 | 90.2 | 6.4 |

It will be noted from this table that the addition of ferrous sulfate in amounts up to some point within the range of 0.5 to approximately 5 millimoles per gram of palladium catalyst results in a marked decrease in time required for either 50% or 100% reaction, an improvement in conversion to the desired hydrazine, and a decrease in conversion to the undesired amine. Improved results were obtained with ferric chloride as well as with ferrous sulfate.

*Example 2.*—A second series of experiments was run to study the effect of iron compounds on the hydrogenation of nitrosodimethylamine with no water or other solvent present, and with 20% water present. One gram of palladium catalyst, of the same composition as in Example 1, was used with 50 milliliters of reaction mixture. Ferrous sulfate was used as the iron salt. The nitrosodimethylamine assayed 97%. The results are given in Table II.

TABLE II

*Hydrogenation of 80% aqueous and 100% nitrosodimethylamine (NDMA)*

| Expt. No. | FeSO₄, Millimoles | NDMA, Percent | Reaction Time, Min. | | Conversion, Percent | |
|---|---|---|---|---|---|---|
| | | | 50% | 100% | Hydrazine | Amine |
| 1 | None | 80 | 133 | (317) | 45.6 | 10.8 |
| 2 | 0.16 | 80 | 67 | 228 | 85.0 | 10.0 |
| 3 | None | 100 | 117 | 444 | 75.6 | 12.4 |
| 4 | 0.20 | 100 | 59 | 297 | 78.4 | 10.0 |

In Experiment No. 1, in which 80% nitrosodimethylamine was used with no iron salt, the reaction stopped after only 60% of the theoretical amount of hydrogen had been taken up. The time given in the table under the heading "Reaction Time, 100%" is the elapsed time when the reaction stopped.

It will be seen from Table II that the beneficial effect of iron salts is obtained when no water or other solvent, or only a minor amount of water, is added to the nitrosamine being hydrogenated.

*Example 3.*—Samples from four different lots of 31% aqueous nitrosodimethylamine were hydrogenated with and without the addition of ferrous sulfate, using the same general procedure as in Example 1. In each case 100 milliliters of the aqueous nitrosamine and 0.5 gram of palladium catalyst were used. The results are given in Table III.

TABLE III

*Hydrogenation of various lots of 31% aqueous nitrosodimethylamine*

| Lot No. | Expt. No. | FeSO₄, Millimoles | Reaction Time, Min. | | Conversion, Percent | |
|---|---|---|---|---|---|---|
| | | | 50% | 100% | Hydrazine | Amine |
| I | A | None | 43 | 136 | 94.2 | 5.8 |
| | B | 1.0 | 30 | 84 | 97.2 | 1.5 |
| II | A | None | 146 | | ᵃ 87 | ᵃ 11 |
| | B | 0.23 | 34 | 98 | 89.9 | 6.5 |
| | C | 0.23 | 33 | 97 | 92.0 | 4.8 |
| III | A | None | 74 | 237 | 86.4 | 9.2 |
| | B | 0.16 | 32 | 83 | 92.4 | 7.3 |
| IV | A | None | 90 | | ᵃ 86 | ᵃ 8.5 |
| | B | 0.12 | 34 | 90 | 92.1 | 7.2 |

ᵃ Reactions not carried to completion. Conversions estimated by extrapolating to complete hydrogen uptake.

From the results it is seen that when no ferrous sulfate was used the time for 50% reaction varied from 43 to 146 minutes and the conversion to the hydrazine varied from 86% to 94%. When ferrous sulfate was present the corresponding ranges were 30 to 34 and 89.9% to 97.2%. These data illustrate the smoothing out of results as regards reaction rate from lot to lot and the generally higher yields obtained with a given lot of nitrosamine when an iron salt is present.

In runs I–B and II–C ferrous sulfate heptahydrate was added directly to the nitrosodimethylamine solution followed by addition of the catalyst. In runs II–B, III–B, and IV–B the ferrous sulfate was adsorbed onto the catalyst from aqueous solution, the catalyst was separated by centrifuging, and then was added to the nitrosodimethylamine solution. The results were similar for the two methods of introducing the iron salt.

In other runs in which iron was added in the form of ferric ammonium sulfate or ferrous ammonium sulfate the results were similar to those shown in Table III.

*Example 4.*—Various nitrosamines were hydrogenated with and without added ferrous sulfate and with water and aqueous ethyl alcohol as reaction media. Results are summarized in Table IV.

TABLE IV

Hydrogenation of various nitrosamines

| Run No. | Nitrosamine | Iron salt | Reaction Medium | Time, Min. | Conversion to Hydrazine, Percent | Ratio * |
|---|---|---|---|---|---|---|
| 1 | Dimethyl | None | $H_2O$ | 40 | 89 | 0.85 |
| 2 | ----do---- | $FeSO_4$ | $H_2O$ | 17 | 93 | 0.88 |
| 3 | Diethyl | None | $H_2O$ | 180 | 77 | 0.71 |
| 4 | ----do---- | $FeSO_4$ | $H_2O$ | 100 | 87 | 0.84 |
| 5 | ----do---- | None | 10% EtOH | 335 | 77 | 0.72 |
| 6 | ----do---- | $FeSO_4$ | 10% EtOH | 100 | 88 | 0.89 |
| 7 | Di-n-propyl | None | $H_2O$ | 210 | 68 | 0.63 |
| 8 | ----do---- | $FeSO_4$ | $H_2O$ | 100 | 79 | 0.75 |
| 9 | ----do---- | None | 50% EtOH | 780 | 42 | 0.51 |
| 10 | ----do---- | $FeSO_4$ | 50% EtOH | 210 | 73 | 0.65 |
| 11 | ----do---- | None | 95% EtOH | 360 | 9 | 0.46 |
| 12 | ----do---- | $FeSO_4$ | 95% EtOH | 457 | 63 | 0.62 |
| 13 | Di-n-butyl | None | 60% EtOH | 147 | 24 | 0.41 |
| 14 | ----do---- | $FeSO_4$ | 60% EtOH | 153 | 56 | 0.48 |
| 15 | n-Butyl-β-hydroxyethyl | None | 10% EtOH | 460 | 41 | 0.67 |
| 16 | ----do---- | $FeSO_4$ | 10% EtOH | 675 | 61 | 0.67 |
| 17 | Nitrosomorpholine | None | $H_2O$ | 24 | 5 | 0.04 |
| 18 | ----do---- | $FeSO_4$ | $H_2O$ | 9 | 82 | 0.84 |
| 19 | ----do---- | None | 95% EtOH | 140 | 22 | 0.14 |
| 20 | ----do---- | $FeCl_3$ | 95% EtOH | 130 | 80 | 0.81 |
| 21 | Nitrosopiperidine | None | $H_2O$ | 214 | 76 | 0.64 |
| 22 | ----do---- | $FeSO_4$ | $H_2O$ | 39 | 91 | 0.86 |
| 23 | ----do---- | None | 95% EtOH | 373 | 69 | 0.58 |
| 24 | ----do---- | $FeCl_3$ | 95% EtOH | 141 | 81 | 0.77 |
| 25 | Nitrosopyrrolidine | None | $H_2O$ | 155 | 85 | 0.81 |
| 26 | ----do---- | $FeSO_4$ | $H_2O$ | 36 | 90 | 0.85 |
| 27 | Dinitrosopiperazine | None | $H_2O$ | 170 | 20 | 0.09 |
| 28 | ----do---- | $FeSO_4$ | $H_2O$ | 43 | 94 | 0.41 |
| 29 | Ethylphenyl | None | 70% EtOH | 34 | approx. 0 | <0.02 |
| 30 | ----do---- | $FeSO_4$ | 70% EtOH | 58 | 3 | 0.02 |

\* Ratio of moles of hydrazine formed to equivalents of total alkalinity in product. Indicative of relative amounts of hydrazine and by-product amine and ammonia.

Because of the slowness with which the higher nitrosoamines hydrogenated, some of the runs included in Table IV were terminated before the reaction was complete.

The amount of hydrazine formed in the reaction was determined by potentiometric titration with potassium iodate. The product was also analyzed for total alkalinity, which measures hydrazine, amine, and ammonia in the product. Amine and ammonia can not be readily determined separately, but the ratio of moles of hydrazine formed to total alkalinity is indicative of the fraction of reacted nitrosamine that has been converted to the desired product. This ratio is given in the last column in Table IV. It will be noticed that the ratio of hydrazine to total alkaline products was higher when ferrous sulfate was present, with the exception of one instance where no significant difference was detected. In some cases, such as runs 17 and 18, the difference is striking, and changes the process from one that is entirely impractical for the production of the hydrazine to one that gives excellent yields of the compound.

*Example 5.*—The improvement resulting from the use of ferrous sulfate in the hydrogenation of nitrosodimethylamine is shown by the data from plant batches given in Table V.

TABLE V

Effect of ferrous sulfate in hydrogenation of nitrosodimethylamine

| Batch No. | Catalyst, Parts by Wt. | $FeSO_4 \cdot 7H_2O$, parts | Conversion | |
|---|---|---|---|---|
| | | | Percent Hydrazine | Percent Amine |
| 256 | 15 | 0.0 | 69.5 | 10.1 |
| 254 | 15 | 1.0 | 93.7 | 7.2 |
| 253 | 10 | 0.7 | 93.7 | 7.6 |
| 292 | 5 | 0.5 | 96.0 | 2.7 |

This table shows that when ferrous sulfate is added the improved yield of hydrazine is obtained even when the amount of catalyst is reduced to one-third that used in the absence of the iron salt.

*Example 6.*—The improvement in yield of dimethylhydrazine, reduction in yield of dimethylamine, and greater uniformity in yields is shown by the data in Table VI. These data show the average yields and the standard deviations (root mean square method) calculated for five groups of ten plant batches each.

TABLE VI

Effect of ferrous sulfate on uniformity of results

| Runs | Catalyst, Parts by wt. | $FeSO_4 \cdot 7H_2O$, parts | Conversion and Standard Deviation | |
|---|---|---|---|---|
| | | | Percent Hydrazine | Percent Amine |
| 35–44 | 18 | None | 67.5±11.6 | 15.7±2.3 |
| 70–79 | 28 | None | 61.4±17.1 | 20.3±7.4 |
| 149–160 ª | 24 | None | 78.4±18.8 | 10.4±4.5 |
| 565–574 | 7.9 | 0.7 | 90.3±1.7 | 1.0±0.1 |
| 575–584 | 7.5 | 0.7 | 91.0±2.2 | 1.2±0.2 |

ª Two batches excluded because of incomplete data.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. In the process of preparing a substituted hydrazine selected from the group consisting of N-aminomorpholine, N-aminopyrrolidine, N-aminopiperidine, N-aminopiperazine, and N,N-dialkylhydrazines by hydrogenating the corresponding nitrosamine in liquid phase in the presence of a palladium catalyst, the improvement which comprises adding to the reaction mixture a soluble iron salt in sufficient amount to provide 0.0005 to 225 millimoles of iron per gram of catalyst.

2. The process defined in claim 1 in which the palladium is supported on active carbon.

3. The process defined in claim 1 in which the amount of the iron salt is such as to provide approximately 0.5 millimoles of iron per gram of catalyst.

4. The process defined in claim 1 in which the palladium is supported on an inert carrier.

5. The process defined in claim 1 in which the process is carried out in an aqueous medium.

6. The process defined in claim 1 in which the substituted hydrazine is N,N-dimethylhydrazine.

7. The process defined in claim 1 in which the substituted hydrazine is N,N-diethylhydrazine.

8. The process defined in claim 1 in which the substituted hydrazine is N,N-di-n-butylhydrazine.

9. The process defined in claim 1 in which the substituted hydrazine is N-aminomorpholine.

10. The process defined in claim 1 in which the substituted hydrazine is 1,4-diaminopiperazine.

11. The process defined in claim 1 in which the iron salt is ferrous sulfate.

12. The process defined in claim 1 in which the hydrogenation is carried out at 25° to 100° C. under superatmospheric pressure.

13. The process of preparing N,N-dimethylhydrazine which comprises hydrogenating nitrosodimethylamine in aqueous phase in the presence of a supported palladium catalyst and an iron salt, the amount of the iron salt being such as to provide about 0.0005 to about 25 millimoles of iron per gram of supported palladium catalyst.

References Cited in the file of this patent

UNITED STATES PATENTS

| 1,124,776 | Marwedel | Jan. 12, 1915 |
| 2,768,878 | Passino | Oct. 30, 1956 |

FOREIGN PATENTS

| 59,222 | Germany | Dec. 8, 1891 |
| 5,320 1893 | Great Britain | Jan. 13, 1894 |
| 530,727 | Canada | Sept. 25, 1956 |

OTHER REFERENCES

Paal: Berichte, Deutsche Chemische Gesellschaft, vol. 63, pages 57–66 (1930).

UNITED STATES PATENT OFFICE
CERTIFICATION OF CORRECTION

Patent No. 2,979,505                        April 11, 1961

William B. Tuemmler et al.

It is hereby certified that error appears in the above numbered patent requiring correction and that the said Letters Patent should read as corrected below.

Column 2, line 36, for "fulfate" read -- sulfate --; column 6, line 71, for "225" read -- 25 --.

Signed and sealed this 5th day of September 1961.

(SEAL)
Attest:

ERNEST W. SWIDER
Attesting Officer

DAVID L. LADD
Commissioner of Patents